(12) United States Patent
Lee

(10) Patent No.: US 10,722,955 B2
(45) Date of Patent: Jul. 28, 2020

(54) KEY TRACKING SYSTEM AND METHOD OF OPERATION

(71) Applicant: Eric John Lee, Nokomis, FL (US)

(72) Inventor: Eric John Lee, Nokomis, FL (US)

(*) Notice: Subject to any disclaimer, the term of this patent is extended or adjusted under 35 U.S.C. 154(b) by 0 days.

(21) Appl. No.: 16/440,314

(22) Filed: Jun. 13, 2019

(65) Prior Publication Data

US 2020/0038970 A1    Feb. 6, 2020

Related U.S. Application Data

(60) Provisional application No. 62/683,729, filed on Jun. 12, 2018.

(51) Int. Cl.
*H04N 9/47* (2006.01)
*B23C 3/35* (2006.01)
*G06F 16/51* (2019.01)
*G06F 16/58* (2019.01)
*G06K 9/00* (2006.01)
*G06K 9/22* (2006.01)

(52) U.S. Cl.
CPC .......... *B23C 3/35* (2013.01); *G06F 16/51* (2019.01); *G06F 16/5866* (2019.01); *G06K 9/00577* (2013.01); *G06K 9/00671* (2013.01); *G06K 9/228* (2013.01); *B23C 2235/41* (2013.01)

(58) Field of Classification Search
CPC ....... B23C 3/35; G06F 16/51; G06F 16/5866; G06K 9/00577; G06K 9/00671; G08B 13/1427; G08B 13/2417; G08B 13/2448; G08B 13/1454

USPC .......................................................... 348/86
See application file for complete search history.

(56) References Cited

U.S. PATENT DOCUMENTS

| | | | | |
|---|---|---|---|---|
| 6,064,747 A * | 5/2000 | Wills | ................. | B23C 3/35 |
| | | | | 382/100 |
| 6,195,005 B1 * | 2/2001 | Maloney | ................. | G06K 17/00 |
| | | | | 340/568.1 |
| 6,392,543 B2 * | 5/2002 | Maloney | ................. | G06K 17/00 |
| | | | | 340/568.1 |
| 6,707,381 B1 * | 3/2004 | Maloney | ............ | G07C 9/00103 |
| | | | | 340/568.1 |
| 7,336,174 B1 * | 2/2008 | Maloney | ............ | G08B 13/1427 |
| | | | | 340/568.1 |
| 9,330,541 B1 * | 5/2016 | Ortiz | ................. | G08B 21/24 |
| 2002/0023232 A1 * | 2/2002 | Serani | ................. | G06F 21/31 |
| | | | | 726/6 |

(Continued)

*Primary Examiner* — Gims S Philippe
(74) *Attorney, Agent, or Firm* — Mark C. Johnson; Johnson | Dalal

(57) ABSTRACT

A Key Tracking System and Method of Operation allows a user to store a digital image of a key in a memory storage on a mobile device. The digital image of the key is stored with a plurality of keys for a user, creating a database of key images that are viewable for comparison, cutting references, key location identity, and other common key organization and tracking features. The stored digital image of the key is used to comparatively identify the key amongst digital images of a plurality of keys. The stored digital image of key can be compared with an image of a corresponding recall key in order to cut a key bitting for the key that substantially matches the key bitting of the recall key. The stored digital image of the key is associated with a location of a corresponding keyway structure that graphically displays on a digital map.

19 Claims, 14 Drawing Sheets

(56) References Cited

U.S. PATENT DOCUMENTS

2016/0114412 A1\* 4/2016 Bosch .................. G01B 21/20
                                                            409/81

\* cited by examiner

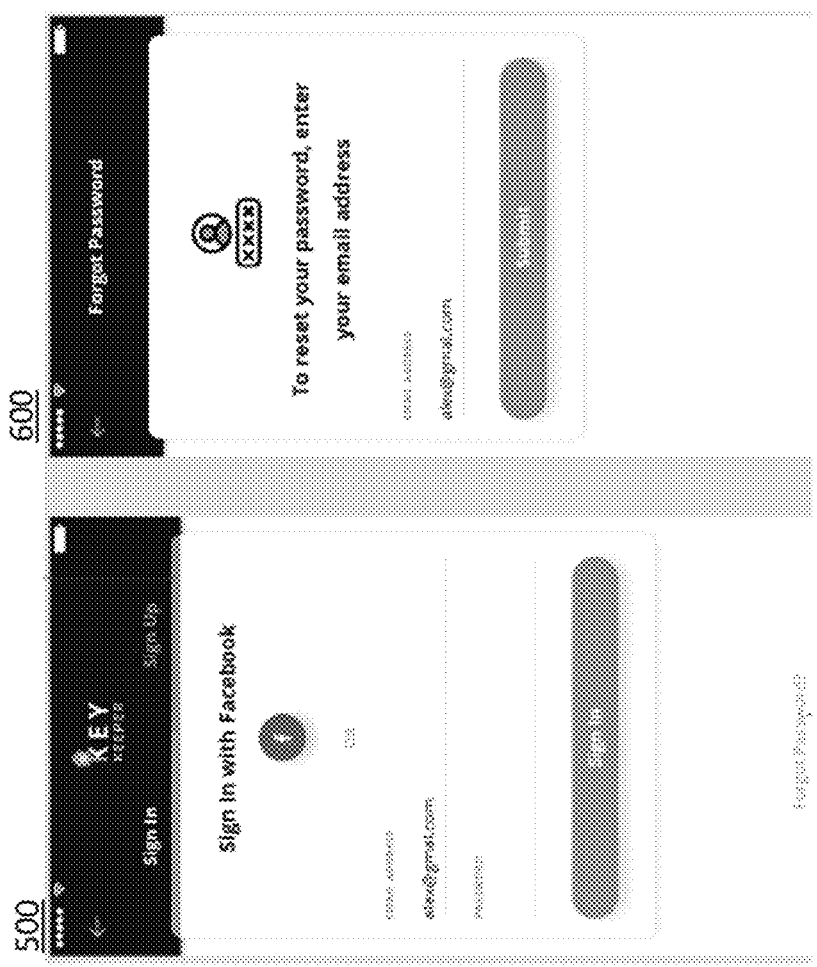

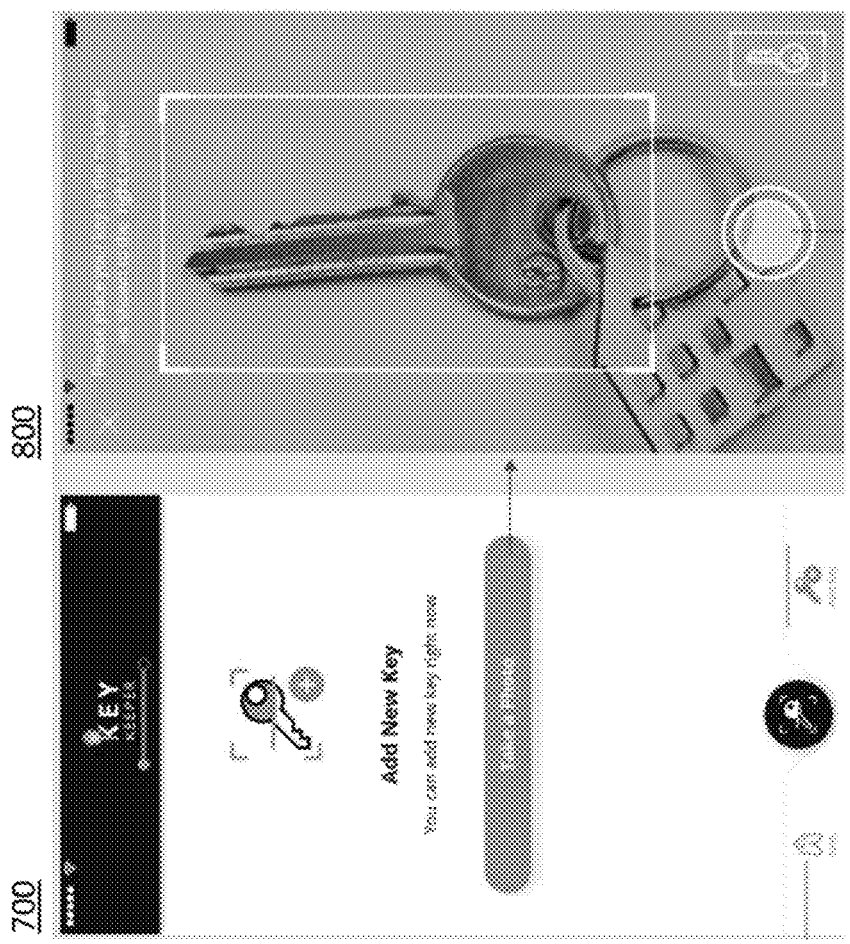

FIG. 11
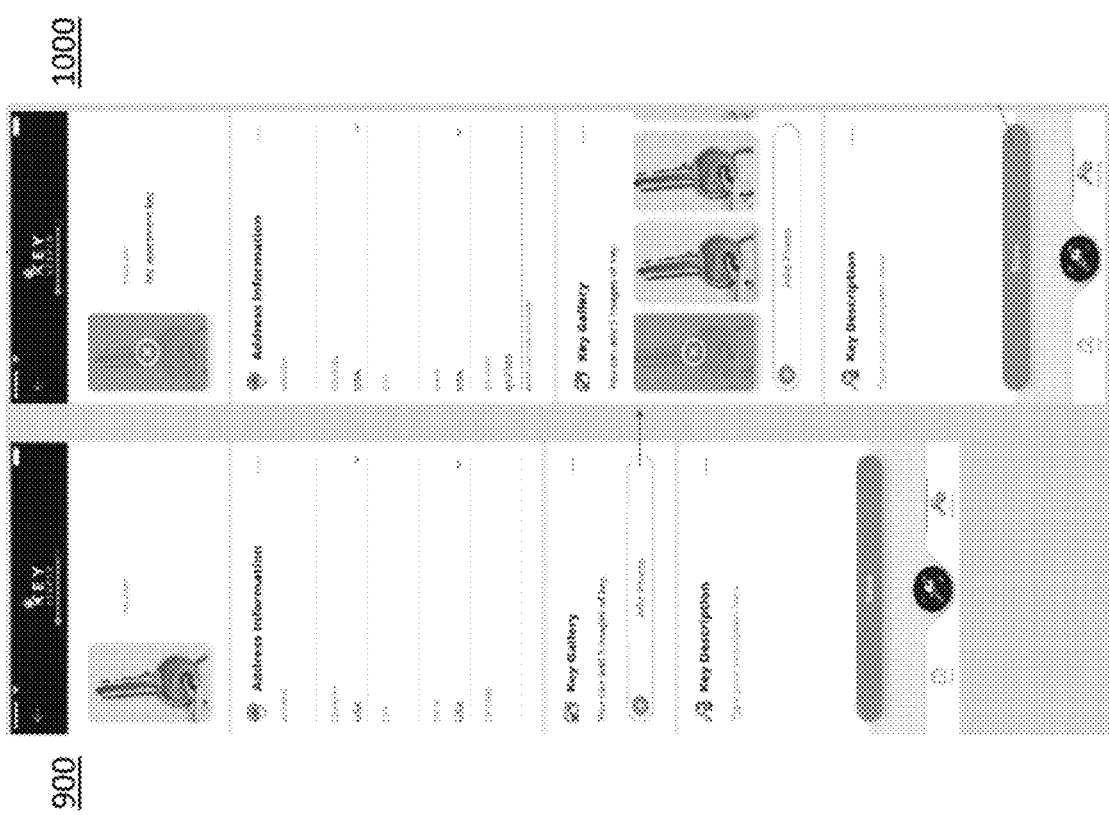
FIG. 10
FIG. 9

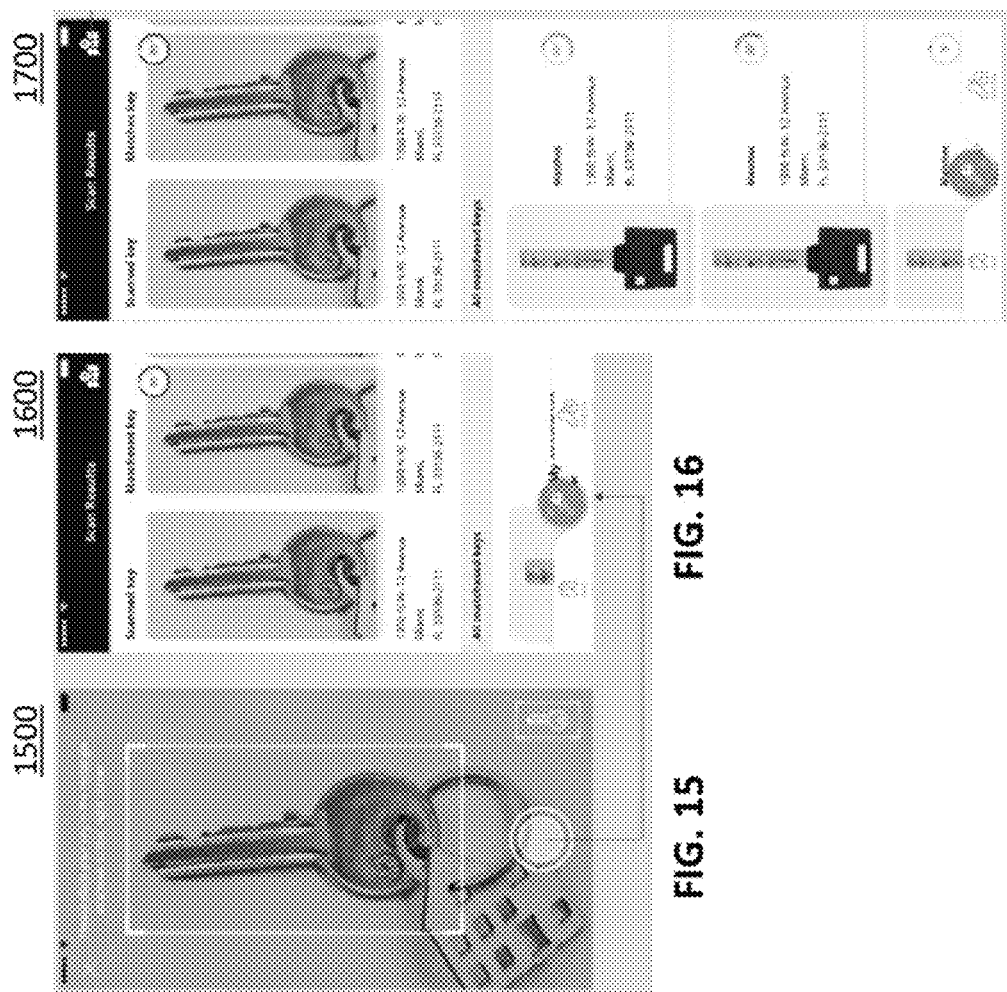

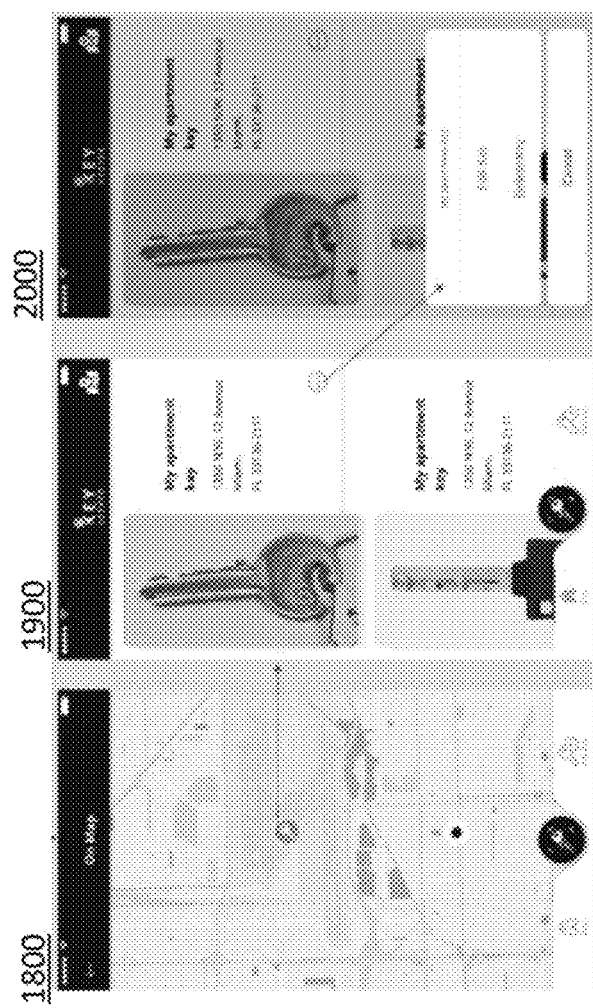

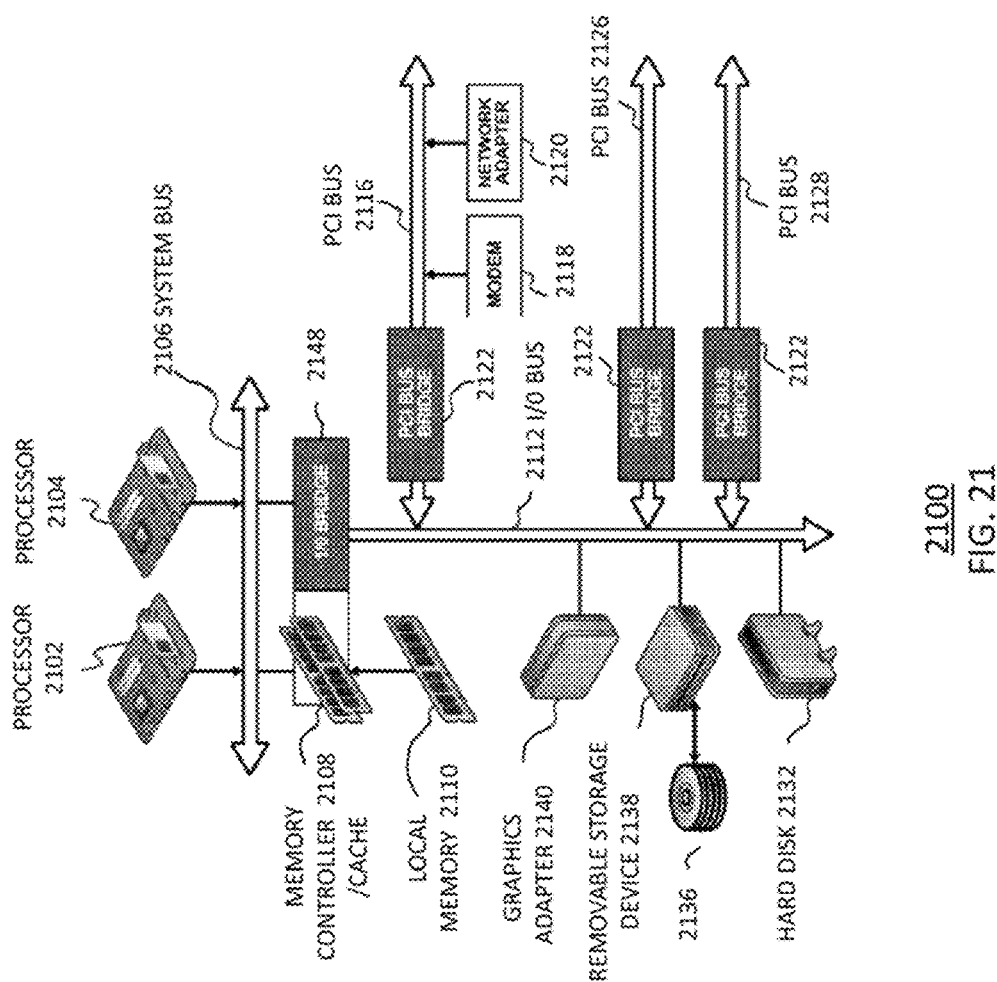

KEY TRACKING SYSTEM AND METHOD OF OPERATION

CROSS-REFERENCE TO RELATED APPLICATION

This application claims priority to U.S. Provisional Patent Application No. 62/683,729 filed Jun. 12, 2018, the entirety of which is incorporated by reference.

FIELD OF THE INVENTION

The present invention relates generally to a key tracking system and method of operation, and, more particularly, relates to a key tracking system that allows a user to store, recall, and reference a plurality of keys, digitally.

BACKGROUND OF THE INVENTION

Typically, keys are cut in such a way as to lift each individual pin to its correct height to unlock the lock. This combination of key cuts is called the bitting. Each manufacturer designates several properties of the bitting to create a wide variety of possible combinations while still maintaining a functional and durable key. The bit of a key is the part that actually engages the locking mechanism of a corresponding keyways structure, i.e., the tumblers in a pin tumbler lock. It is also known that the exact geometry of modern keys is usually described by a code system, or bitting. The bitting is usually a series of integers (e.g. 372164) that is usually translated from a key code chart or from a bitting code list to settings on specially designed key machines. In many code systems, each digit in the bitting corresponds to a certain pin location on the key blank where a cut or notch is to be made and also indicates the necessary depth of the cut Generally, each key pin can be one of a number of heights predetermined by the manufacturer for a specific lock. Though it varies from brand to brand and model to model, it is common for there to be ten possible heights of key pins. These possible heights are numbered 0 through 9, with 0 being the shortest pin and shallowest cut on the key, and 9 being the longest pin and deepest cut on the key. This is referred to as the depth of cut.

Typically, electrical key-cutting machines use the original key bitting to replicate cuts for a replacement key. However, key-cutters which do not use an original key for patterning the cuts on a replacement key, can utilize key code books that designate the depth and sequence of cuts ion the original key for purposes of making similar cuts on the replacement key blank. In electrical key-cutters, depth-settings are inputted into a processor for automated cutting of the blank key. However, the bitting of the original key must be known to make the same cuts. If the original key is lost, this may not always be possible.

The prior art does, however, teach an automated key cutting machine that allows a limited range of keys to be cut, digitally stored, and re-cut at a later time directly from the key cutting machine. This prior art process, however, does not generate an image of the key. And further, the specs of the key have to be manually inputted directly into the automated key cutting machine at the store. And further, the pin size and position needed to copy the key must be manually inputted. This prior art process also requires that a copy of the key be physically retained for future key copying.

Therefore, a need exists to overcome the problems with the prior art as discussed above.

SUMMARY OF THE INVENTION

The invention provides a Key Tracking System and Method of Operation that overcomes the hereinafore-mentioned disadvantages of the heretofore-known devices and methods of this general type and that is a key tracking system that allows a user to store a digital image of a key in a memory storage on a mobile electronic computing device. The digital image of the key is stored with a plurality of keys for a user, creating a database of key images that can be viewed for comparison, cutting references, key location identity, and other common key organization and tracking features.

In one embodiment, the digital image of the key can be visually compared with a digital image of a corresponding recall key, so as to maintain a database of a plurality of keys directly on the mobile electronic computing device. The stored digital image of the key is also used to comparatively identify the key amongst digital images of a plurality of keys, for reducing confusion between large numbers of keys being held together. The stored digital image can be compared with an image of a corresponding recall key in order to cut a key bitting for the key that substantially matches the key bitting of the recall key. The stored digital image of the key is associated with a location of a corresponding keyway structure. The location of the keyway structure graphically displays on a digital map, so as to identify the appropriate keyway structure for the key amongst a plurality of keys having their own keyway structures. Conversely, the digital image of the key can be viewed by inputting the location of the keyway structure.

With the foregoing and other objects in view, there is provided, in accordance with the invention, a computer software-implemented key tracking method comprising an initial Step of providing a mobile electronic computing device of a user having a camera operably coupled thereto and a memory resident thereon.

The method also includes a Step of logging in to a key-tracking mobile software application through the mobile electronic computing device.

In some embodiments, the method may include a Step of capturing, through the camera on the mobile electronic computing device of the user, a digital image of a key.

Another Step may include utilizing the key-tracking mobile software application resident on the memory of the mobile electronic computing device of the user to obtain a unique key identifier associated with a key bitting corresponding with the key and from the digital image of the key.

The method also includes a Step of inputting a key description through a user interface of a display of the mobile electronic computing device of the user and associating the key description with the unique key identifier.

Another Step may include storing the unique key identifier and key description on the memory of the mobile electronic computing device of the user, the memory having a plurality of unique key identifiers with associated key descriptions resident thereon and corresponding with a plurality of keys of the user.

In one embodiment, a Step comprises receiving, through the camera on the mobile electronic computing device of the user, a secondary digital image of a recall key.

The method also includes a Step of utilizing the key-tracking mobile software application to obtain a secondary unique key identifier associated with a key bitting corresponding with the recall key and from the digital image of the recall key.

Yet another Step comprises comparing the secondary unique key identifier to the plurality of unique key identifiers to ascertain at least one of a key-match or key-non-match, the key-match representing the secondary unique key identifier of the recall key substantially corresponding to the unique key identifier associated of the key and causing the key-tracking mobile software application to display on the user interface at least one of the key description and the digital image corresponding to the key.

In one embodiment, a Step comprises providing an electronic key-cutting machine communicatively coupled to the mobile electronic computing device of the user, the electronic key-cutting machine being operable to cut the key bitting corresponding with the recall key.

In some embodiments, a Step includes communicating the key bitting corresponding with the recall key to the electronic key-cutting machine.

Yet another Step comprises cutting, with the electronic key-cutting machine, the key such that the key bitting substantially matches the key bitting of the secondary unique key identifier of the recall key corresponding to the key.

Yet another Step comprises storing a location of a keyway structure associated with the unique key identifier and the key description on the memory of the mobile electronic computing device of the user.

Another Step may include displaying, by the key-tracking mobile software application, on the user interface, a digital map, the digital map identifying the location of the keyway structure associated with the unique key identifier and the key description.

A final Step includes inputting the location of the keyway structure through the user interface of the display of the mobile electronic computing device of the user and associating the keyway structure with the key description and causing the key-tracking mobile software application to display on the digital map the key description associated with the keyway structure.

In accordance with a further feature of the present invention, the electronic key-cutting machine is remotely located from the user.

In accordance with a further feature of the present invention, the electronic key-cutting machine is operable by the user.

In accordance with a further feature of the present invention, the key description comprises a picture taken of the key, a description of the key, or both.

In accordance with a further feature of the present invention, the unique key identifier includes at least one of the following: a key brand name, a key type, a number of pins, a pin key code, and the location of the keyway structure.

In accordance with another feature, an embodiment of the present invention includes capturing a picture, through the camera on the mobile electronic computing device, of the digital image of the key.

In accordance with another feature, an embodiment of the present invention includes scanning, through the camera on the mobile electronic computing device, the digital image of the key.

Although the invention is illustrated and described herein as embodied in a Key Tracking System and Method of Operation, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the key, spanning from a top end to a bottom end of the key. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 5 is a screenshot registering, by an administrator, a username, password, and user personal information, in accordance with the invention;

FIG. 6 is a screenshot showing a log-in text field, in accordance with the invention;

FIG. 7 is a screenshot showing the mobile electronic computing device capturing a picture, through the camera, in accordance with the invention;

FIG. 8 is a screenshot showing the key placed inside the lens area of the camera for capturing an image, in accordance with the invention;

FIG. 9 is a screenshot showing the input of a key description through the display of the mobile electronic computing device, in accordance with the invention;

FIG. 10 is a screenshot showing the key description being input into a text field, in accordance with the invention;

FIG. 11 is a screenshot showing a dialogue box that instructs the key has been imaged and stored into the memory of the mobile electronic computing device, in accordance with the invention;

FIG. 15 is a screenshot showing a key being scanned for capturing an image thereof, in accordance with the invention;

FIG. 16 is a screenshot showing a scanned digital image of the key substantially matching the recall key secondary identifiers, in accordance with the invention;

FIG. 17 is a screenshot showing a key-non-match scenario, in accordance with the invention;

FIG. 18 is a screenshot showing the digital map, and a keyway structure on the digital map, in accordance with the invention;

FIG. 19 is a screenshot showing a pair of keys with their corresponding keyways structure locations, which are viewable on the digital map, in accordance with the invention;

FIG. 20 is a screenshot showing an edit page that enables deleting the key from memory, and editing the key description, in accordance with the invention;

FIG. 21 is a block diagram of a data processing system implemented as a server to a potential network facilitating in the key tracking and management method, in accordance with the invention;

DETAILED DESCRIPTION OF INVENTION

Figure 1:
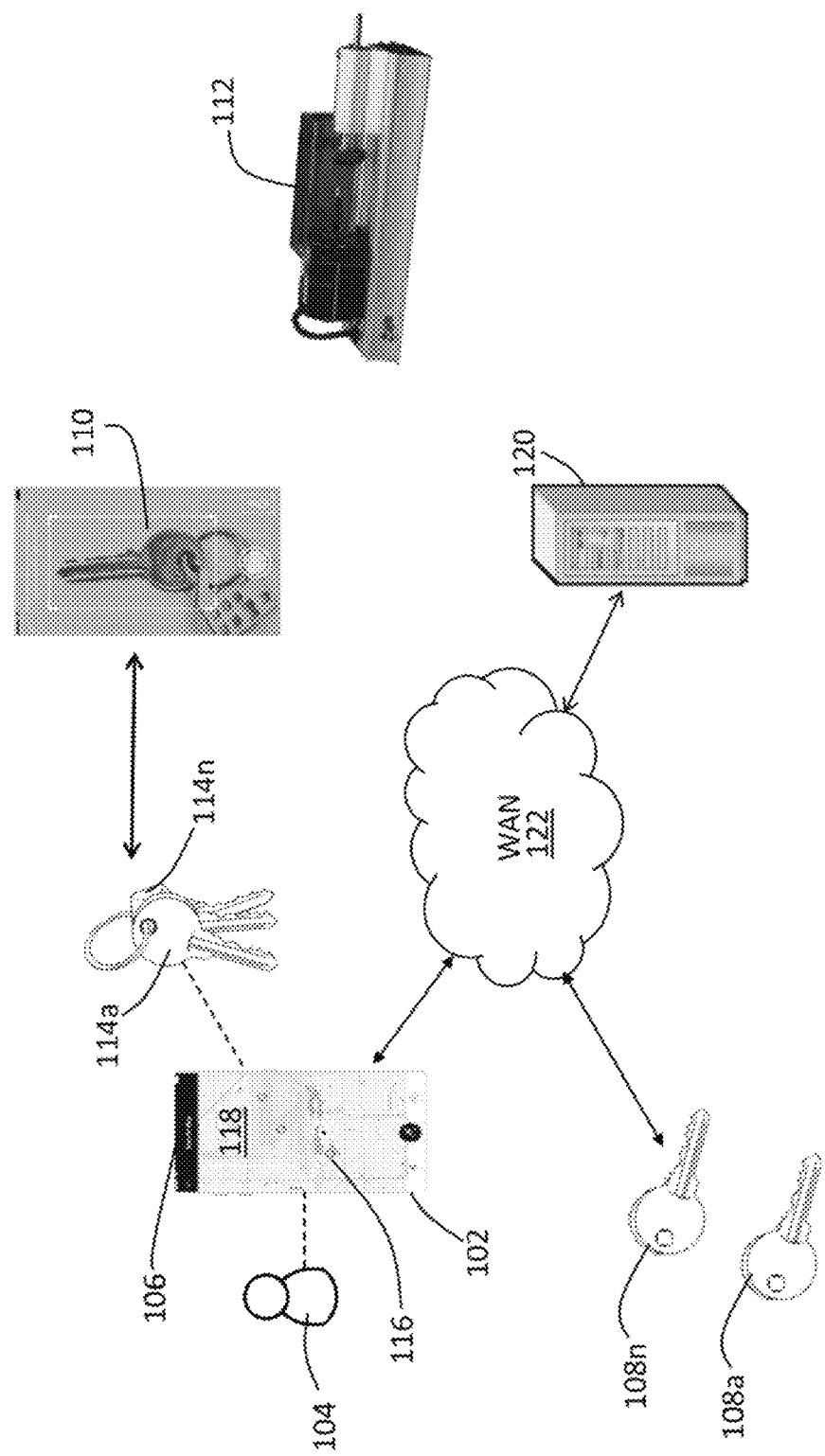
FIG. 1 is a block diagram of an exemplary key tracking system, in accordance with the invention.

The invention described herein provides a key tracking system 100 and method 400 of operation that overcomes known disadvantages of those known devices and methods of this general type and that effectively and efficiently captures, sorts, manages, organizes, and/or displays various key bittings, i.e., the part of a key that actually engages the locking mechanism of a lock. The key tracking system is also operable to duplicate a key stored in the database when it is lost or unavailable. Although the invention is illustrated and described herein as embodied in a key tracking system and method of operation, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the key, wherein "transverse" should be understood to mean a direction corresponding to a direction opposite the longitudinal direction. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The attached figures are incorporated in and form part of the specification, and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

As the block diagram of FIG. 1 references, a key tracking system 100 comprises a mobile electronic computing device of a user 104. The mobile communication device has a camera 106 that is operably coupled thereto and a memory resident thereon. The mobile electronic computing device 102 allows a user 104 to store a digital image 110 of a key 114a-n in a memory storage, directly on, or remotely located from, the mobile electronic computing device 102. In some embodiments, the mobile electronic computing device 102 may include, a smart phone, or a small portable tablet. The mobile electronic computing device 102 has a storage memory, such a 64 k, and/or is in operative communication with a remote memory server or database. This allows for storing and viewing large numbers of key images and key descriptions, representing a plurality of keys in possession of the user 104, directly on the mobile electronic computing device 102.

The system 100 also includes a key-tracking mobile software application that is downloadable to the mobile electronic computing device 102. The key-tracking mobile software application operates the method 400, including image storage, image recall, key bitting matching, and geographic location of keyway structure 116s corresponding to the keys. An algorithm operating from a software code on the key-tracking mobile software application processes these functions.

The system 100 allows the user 104 to capture a digital image 110 of the key through the camera 106 on the mobile electronic computing device 102. The digital image 110 of the key is stored with other digital image 110s for a plurality of keys for a user 104, creating a database of key images that can be viewed for identifying keys, comparing keys, referencing keys for cutting against a recall key 108a-n, identifying a keyway structure 116 that corresponds to a key, and performing other common key organization and tracking features.

In one embodiment, the stored digital image 110 of the key 114a-n is used to comparatively identify the key 114a amongst digital images of a plurality of keys 114n, so as to reduce confusion between large numbers of keys being held together. The stored digital image 110 of the key can also be compared with an image of a corresponding recall key 108a-n in order to cut a key bitting for the key that substantially matches the key bitting of the recall key 108a-n. The stored digital image 110 of the key is also associated with a location of a corresponding keyway structure 116; and conversely, the keyway structure 116 can be inputted into the key-tracking mobile software application to identify the corresponding key.

Figure 2:
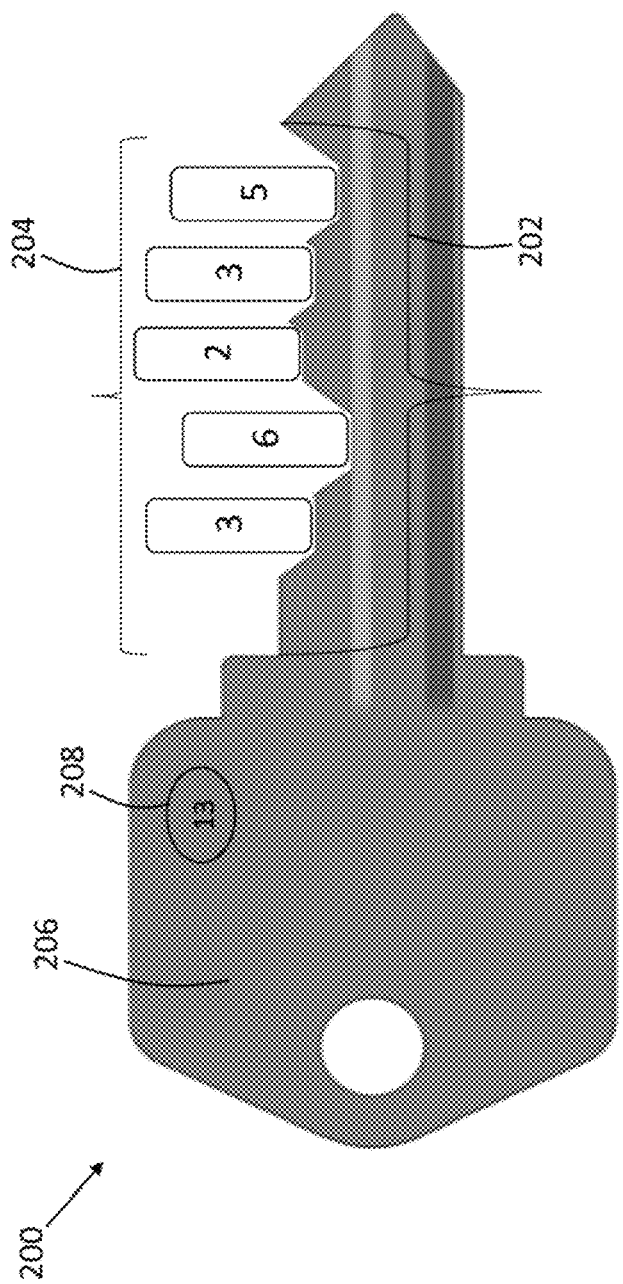
FIG. 2 is a side view of an exemplary key, showing the bits and corresponding pins in a keyway, in accordance with the invention.

FIG. 7 illustrates a screenshot 700 of the mobile electronic computing device 102 capturing a picture, through the camera 106, of the key. FIG. 8 shows a screenshot 800 of the key placed inside the lens area of the camera 106 for capturing an image. In another embodiment of the digital imaging, FIG. 15 references a screenshot 1500 showing the key being scanned for capturing an image thereof. In both means of capturing the digital image 110, the bit of the key is imaged, so that the width and depth of the channels in the key bit are clearly recorded for storage in memory. For example, FIG. 2 shows a top view of a key 200 having bits 202 that engage a corresponding pin 204 from a keyway. The arrangement, shape, and dimensions of the bits 202 are stored in the memory for subsequent comparison with a recall key 108a-n, and subsequently cutting new bits into the key.

Again, looking at FIG. 2, the system 100 provides a unique key identifier 208 associated with a key bitting 202 that corresponds with the key 200 and the digital image 110 thereof. The unique key identifier 208 utilizes the key-tracking mobile software application resident on the memory of the mobile electronic computing device 102. If the key 200 is not stored in the database, the user 104 may be prompted that the key is not in the database and may also be prompted to scan the key to obtain a unique key identifier associated with said key. The user 104 may individually or collectively scan a number of key(s) to obtain a unique key identifier 208 for the key(s) desired to be tracked.

In one embodiment, sectioning the key 200 along its longitudinal length can be used to define equal or disproportionate widths along the section lines, whereby the section lines have lengths defining the unique key identifier. Another method for capturing images of the key identifier may include determining a bitting pattern 202 of the key 200. The key 200 has a housing used for optically outlining at least the profile of the blade of the key to form an image. The image is then digitized and information created therefrom, including information about the width of the blade of the key at a plurality of selected longitudinal positions along the length to include the width of the blade at the location of at least one cut of the bitting pattern. The information about the bitting pattern of the key digitized can then be used to form the unique key identifier.

Those skilled in the art will recognize that the bit of a key 200 is the part that actually engages the locking mechanism of a corresponding keyways structure, i.e., the tumblers in a pin tumbler lock. It is also known that the exact geometry of modern keys is usually described by a code system 100, or bitting. The bitting 202 is usually a series of integers (e.g. 372164) that is usually translated from a key code chart or from a bitting code list to settings on specially designed key machines. In many code system 100s, each digit in the bitting corresponds to a certain pin location 204 on the key blank where a cut or notch is to be made and also indicates the necessary depth of the cut. The bitting sequence may be ascertained from bow-to-tip (the bow being the larger, handle portion of the key), or can be from tip-to-bow. A smaller number is typically a shallower cut on the key, but not always.

In some embodiments, the unique key identifier of the key may include a key brand name, a key account number, a key manufacturer, a key type, and a 6-number key pin code. For example, the mobile electronic computing device 102 displays the brand or type of key in a drop-down menu, Kwikset, Master Lock, Yale, etc. A second drop-down menu offers the option of key types: KW16, KW13, etc. Furthermore, it is known in the art that the number of pins used on the keyway and pins are typically 5, 6, or 7 and the size of the pins. Thus, another unique key identifier may include a 6-pin key with a code 231231. In such an identification, there might be 5 different pin lengths in a typical common lock, so from the key image the pin size (1 to 5) is extracted for each of the pin locations (1 through 6). Such a pin combination provides a simple data set that would be sent to the electronic key-cutting machine for cutting the key bitting, as described below.

In addition to the key identifier, the key is also provided with a key description 206 to help identify the use of the key. The user 104 inputs the key description through a user 104 interface of the display of the mobile electronic computing device 102. Once inputted, the key description 206 is associated with the unique key identifier described above. Thereafter, the user 104 will associate the key description (as discussed below) with a respective unique key identifier. Both the unique key identifier and key description are stored in the database for recall by the user 104 when he or she desires to figure out which of the plurality of keys are for a particular lock. As such, the user 104 may store a plurality of unique key identifiers and key descriptions into the memory or database for recall to effectively and efficiently track and manage a plurality of keys.

Thereafter, when a user 104 desires to recall a particular key, the user 104 will look up or locate a key description in a key database, e.g., memory, housed locally on a user 104's electronic device 102, e.g., cellphone, and/or remotely on a server 120, e.g., the administrator's server, communicatively coupled to a user 104's electronic device 102. The key description 206 may include a picture taken of a key and/or a description of the key, e.g., "house key on 1$^{st}$ street front door key," "house key side door," "grey Lexus RX350 ignition key," "work key," etc. to facilitate in helping a user 104 identify which key should be used for which lock. If the key description is stored in the database, which his reflected in the flow diagram of FIG. 1, the program will cause the key description to display on the user's 104 electronic device 102.

Figure 3:
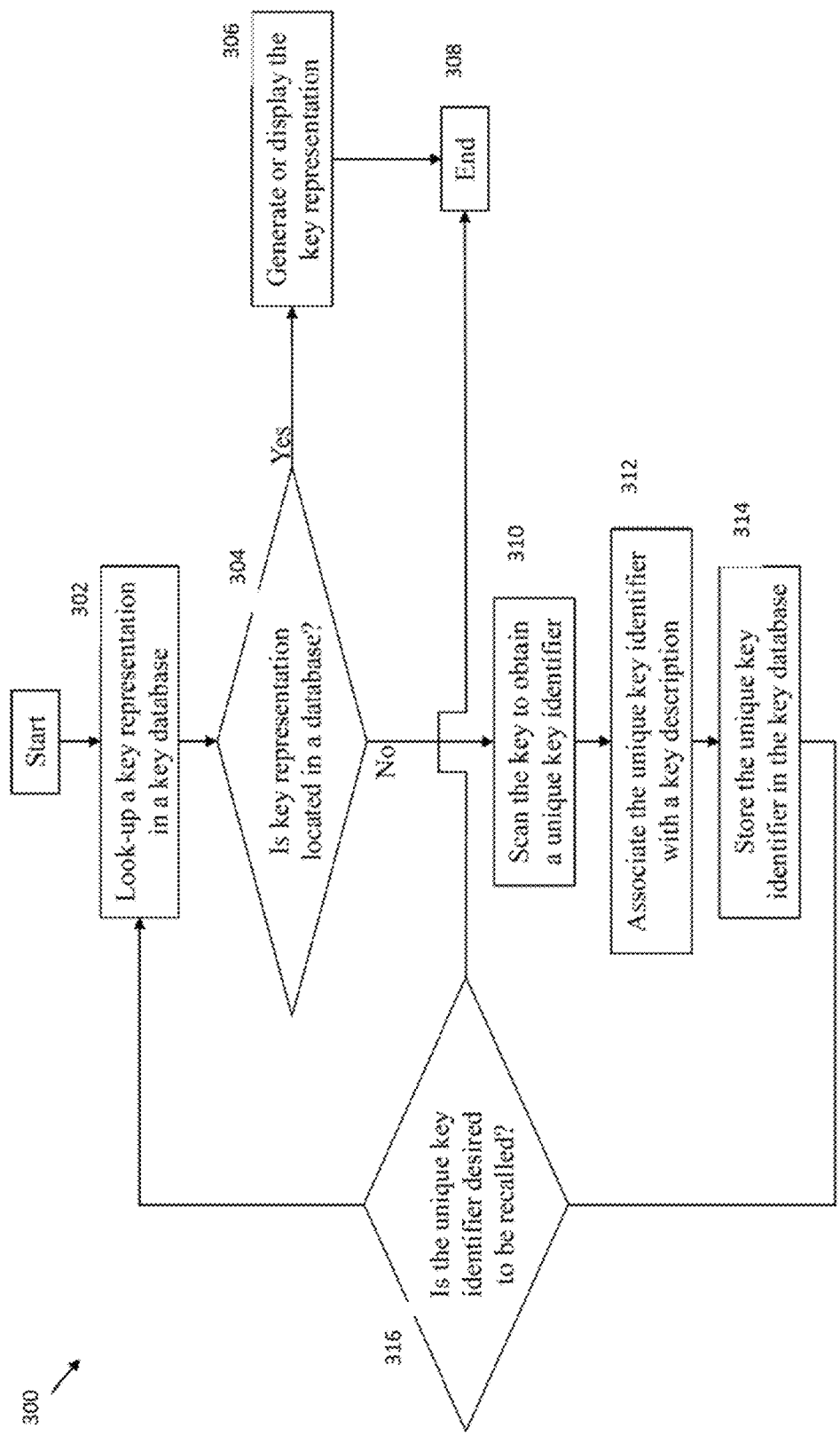
FIG. 3 is an exemplary flowchart for a key tracking process for storing and recalling a key identifier of a key, in accordance with the invention.

An example of the user 104 storing and later recalling a key identifier in the memory is referenced in the flowchart of FIG. 3. In this key tracking process 300, a Step 302 comprises a user 104 initially looking-up a key representation in a key database on the memory of the mobile electronic computing device 102. The user 104 is attempting to determine if the key is stored, or requires an image to be captured for creating the key identifier. At 304, the user 104 must decide if the key is located in the memory. If yes, then Step 306 allows the user 104 to download the digital image 110 of the key for viewing on the mobile electronic computing device 102. The user 104 then terminates the process by comparing the digital image 110 with a recall key 108a-n, or the keyway structure 116 associated with the key.

However, if the key is not located in the memory of the mobile electronic computing device 102, 310 requires the user 104 to scan (or take a picture of) the key to capture the key bitting. At 312, the unique key identifier is associated with the key description. For example, a key has a Master Lock brand name, of key types: KW16, and a 6-pin key with a code 231231. This key is associated with a key description, such as a house key for a front door; or an automobile driver-side door. At Step 314, the key identifier and the key description are stored in the memory of the mobile electronic computing device 102. After the key information is stored, the user 104 must decide whether the key identifier and description are needed, at Step 316. If not, then the user 104 terminates at 308. However, if the key identifier and description are required, then the user 104 starts over, looking-up a key description in the memory of the mobile electronic computing device 102.

In addition to the key identifier and key description, the system 100 also utilizes a secondary digital image 110 of a recall key 108a-n that is received through the key-tracking mobile software application on the mobile electronic computing device 102. A secondary unique key identifier is associated with a key bitting, corresponding with the recall key 108a-n. The secondary unique key identifier is matched with the key identifier of the key, described above. The secondary unique key identifier is compared to the plurality of unique key identifiers to ascertain at least one of a key-match or key-non-match. The key-match represents the secondary unique key identifier of the recall key 108a-n substantially corresponding to the unique key identifier associated of the key. This causes the key-tracking mobile software application to display on the user 104 interface at least one of the key description and the digital image 110 corresponding to the key. Conversely, the key-non-match indicates that the key identifier and description are either not stored in memory, or there is not a corresponding recall key 108a-n with matching secondary unique key identifier.

For example, FIG. 16 shows a screenshot 1600 where a scanned digital image 110 of the key substantially matches the recall key secondary identifiers. This is a key-match scenario, as described above that allows a key bitting to be cut to the specifications of the recall key 108a-n. However, FIG. 17 illustrates a screenshot 17 showing a key-non-match scenario, where a first non-match key has a 60% chance of matching, and a second key has a 30% chance of matching the key. The key-match scenario has many useful applications. For example, a skilled locksmith can use the recalled image of the recall key 108a-n to make a copy of a wide range of keys. This may include complex keys that are too numerous to be done by machines. However, it is recognized that high security keys with exaggerated pin depth and angled faces may not be possible to cut based on the recall key image.

The system 100 stores the key identifier and secondary key identifier so that, if the key is lost, a replacement key can be cut based on the key identifiers, i.e., key bitting. For this purpose, the system 100 provides an electronic key-cutting machine 112 that is communicatively coupled to the mobile electronic computing device 102 of the user 104. The electronic key-cutting machine 112 is operable to cut the key bitting of the key that substantially matches the bitting of the recall key 108a-n. In one embodiment, the key bitting corresponding with the recall key 108a-n is communicated to the electronic key-cutting machine 112.

The key is operational with a keyway structure 116, such as a door keyway, a gate keyway, a vehicle ignition keyway, a safe keyway, or any keyway that requires a key to open a connected structure. The keyway structure 116 is associated with the unique key identifier and the key description that is stored on the memory of the mobile electronic computing device 102. Thus, each key has a stored keyway structure 116, and location thereof. The system 100 also provides a digital map 118 that displays, on the user 104 interface, the location of the keyway structure 116 associated with the key description. The location of the keyway structure 116 graphically displays on a digital map 118, so as to identify the appropriate keyway structure 116 for the key amongst a plurality of keys having their own keyway structure 116s. Conversely, the digital image 110 of the key can be viewed by inputting the location of the keyway structure 116.

Figure 4A:
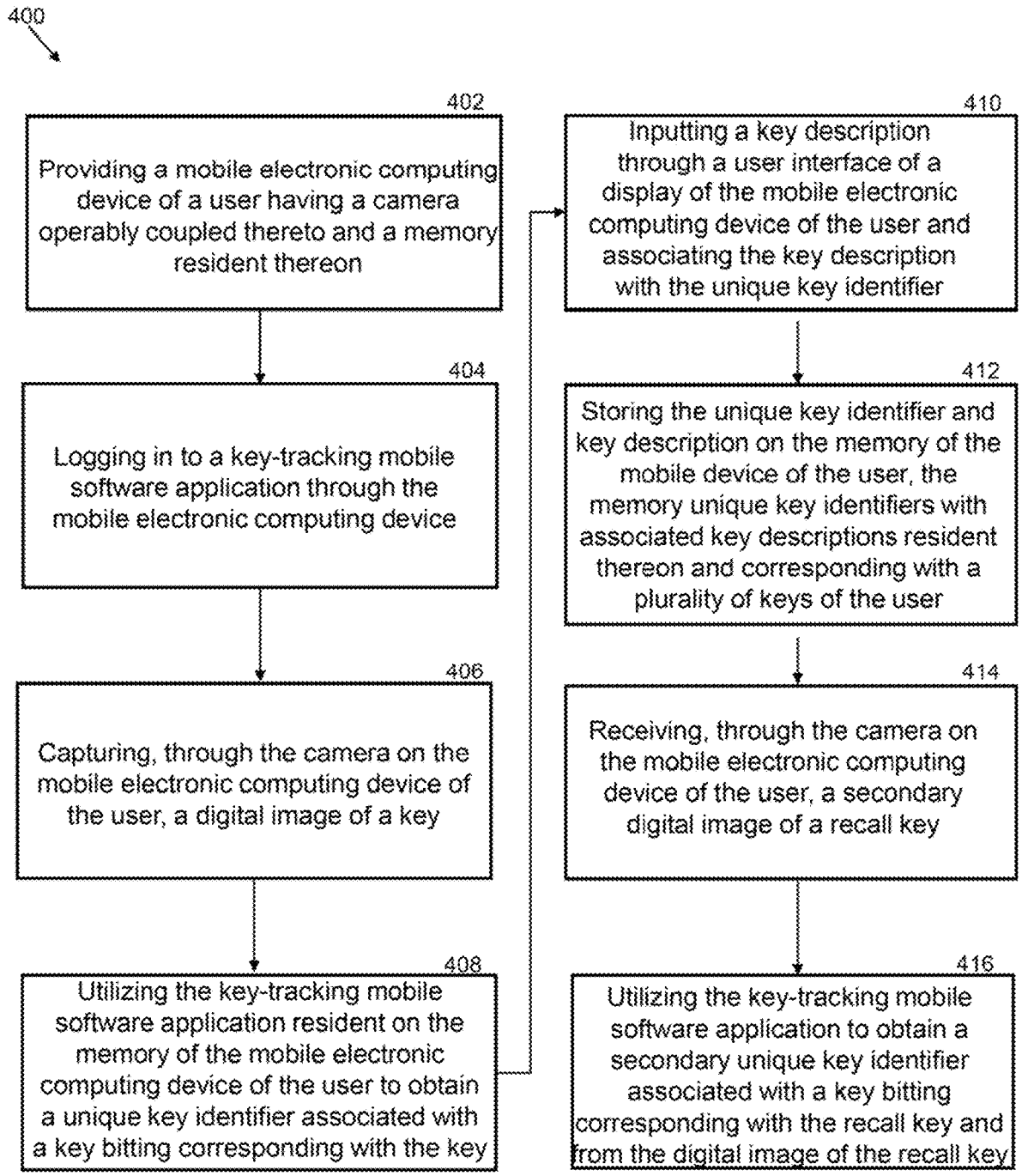
FIGS. 4A and 4B are flowcharts for an exemplary key tracking method, in accordance with the invention.
Figure 4B:
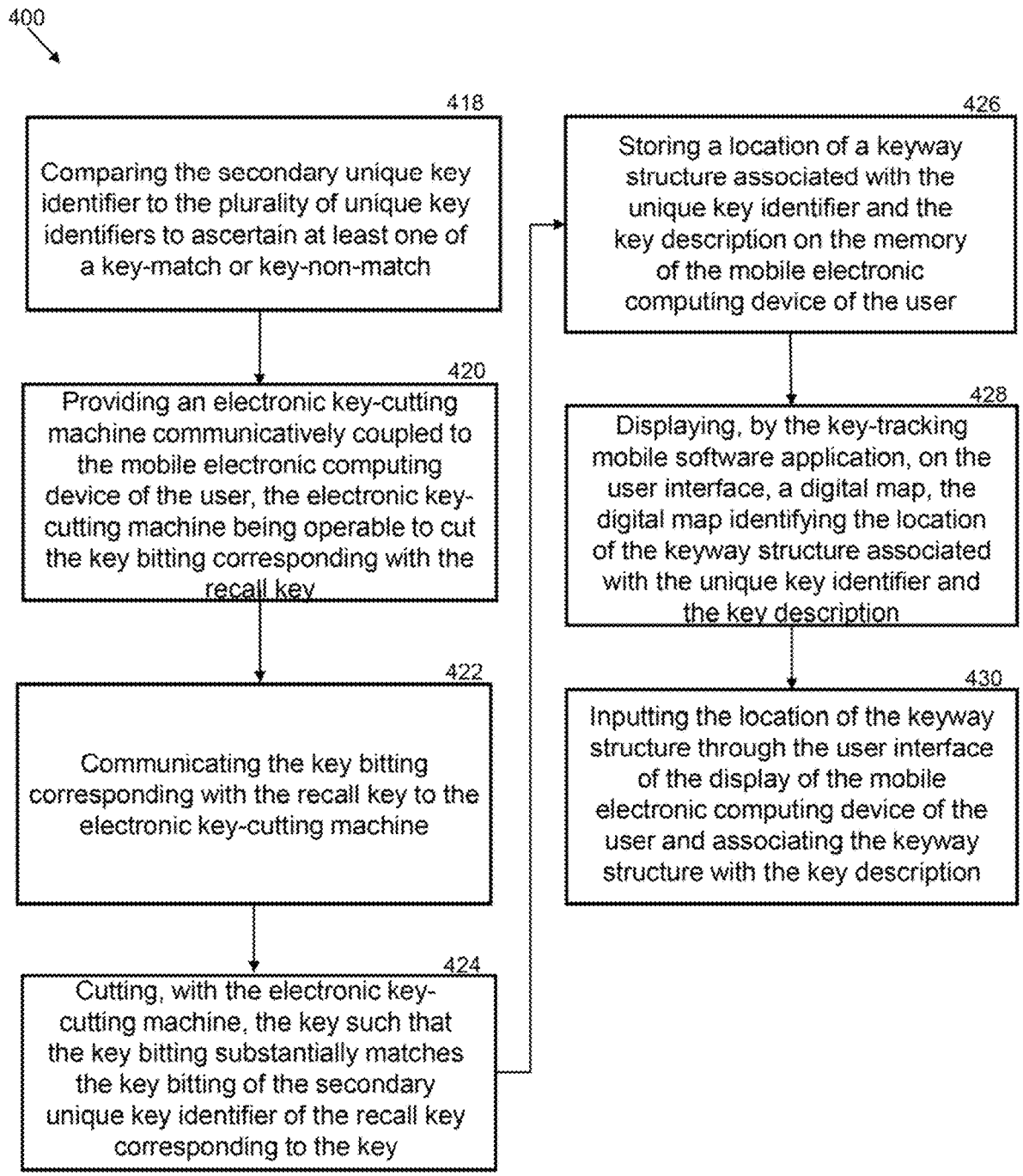

As FIGS. 4A-4B reference, a computer software-implemented key tracking method 400 comprises an initial Step 402 of providing a mobile electronic computing device 102 of a user 104 having a camera 106 operably coupled thereto and a memory resident thereon. The mobile electronic computing device 102 allows the user 104 to operate the system 100 and method 400 while on the move, which can be useful for matching, cutting, and using a key amongst a plurality of keys. Those skilled in the art will recognize that certain jobs, such as a landlord, a janitor, a rental car employee, and other user 104s who require large amounts of keys are often mobile, and thereby cannot always be near a large, stationary computer. Thus, the mobile electronic computing device 102 allows the appropriate freedom for the demands of the job.

In some embodiments, the mobile electronic computing device 102 may include, a smart phone, or a small portable tablet. The mobile electronic computing device 102 has a storage memory, such a 64 k, and/or is in operative communication with a remote memory server or database 120. This allows for storing and viewing large numbers of key images and key descriptions directly on the mobile electronic computing device 102. Additionally, the mobile electronic computing device 102 includes a camera 106 used for capturing a digital image 110 of the key and further, a plurality of keys or the user 104. Once the digital image 110 is captured, descriptive identification and storage is performed.

The method 400 also includes a Step 404 of logging in to a key-tracking mobile software application through the mobile electronic computing device 102. As the screenshot 500 in FIG. 5 shows, the process begins with a user 104 registering with an administrator through creating a user 104 name, password, and/or user 104 personal information, along with information regarding the quantity and/or type of keys the user 104 has. Registration may be free to the user 104 up to a certain number of keys desired to be inserted and/or tracked. As shown in screenshot 600 of FIG. 6, the log-in is a standard input of personal user 104 name, password, and social media log-in at the text fields. The key-tracking mobile software application operates the method 400, including image storage, image recall, key bitting matching, and geographic location of keyway structure 116s corresponding to the keys. An algorithm operating from a software code on the key-tracking mobile software application processes these functions through processing means known in the art.

The software code is configured to control various functions, including: downloading the key-tracking mobile software application, storing the key bitting information for the key and the recall key 108a-n in the mobile electronic computing device 102, matching the key description and unique key identifier of the key with secondary unique key identifier associated with a key bitting corresponding with the recall key 108a-n based on the digital image 110 of the recall key 108a-n, communicating the key bitting corresponding with the recall key 108a-n with an electronic key-cutting machine, and tracking the location of the keyway structure 116 on a digital map 118. Furthermore, a few narrow functions that the software code operates are referenced at the end of the specification hereto.

In some embodiments, the method 400 may include a Step 406 of capturing, through the camera 106 on the mobile electronic computing device of the user 104, a digital image of a key. FIG. 7 illustrates a screenshot 700 of the mobile electronic computing device capturing a picture, through the camera 106, of the key. FIG. 8 shows a screenshot 800 of the key placed inside the lens area of the camera 106 for capturing an image. In another embodiment of the digital imaging, FIG. 15 references a screenshot 1500 showing the key being scanned for capturing an image thereof.

In both means of capturing the digital image, the bit of the key is viewed from a planar disposition, so that the width and depth of the channels in the key bit are clearly recorded for storage in memory. For example, FIG. 2 shows a top view of a key having bits that engage a corresponding pin from a keyway. The arrangement, shape, and dimensions of the bits are stored in the memory for subsequent comparison with a recall key 108a-n, and cutting new bits.

Another Step 408 may include utilizing the key-tracking mobile software application resident on the memory of the mobile electronic computing device of the user 104 to obtain a unique key identifier associated with a key bitting corresponding with the key and from the digital image of the key. The unique key identifier represents the key bitting information for the key. The unique key identifier has a corresponding key identifier from a recall key 108a-n. Thus, if the key is misplaced, or identification thereof is confused, the digital image of the key references the key identifier for matching with the key identifier of the recall key 108a-n. The algorithm on the key-tracking mobile software application matches the key identifiers from both keys to allow for cutting a replacement key.

One exemplary means to generate the unique key identifier may include sectioning the key along its longitudinal length to define equal or disproportionate widths along said section lines, wherein said section lines have lengths defining the unique key identifier. Another method 400 may include determining a bitting pattern of a key having a housing used for optically outlining at least the profile of the blade of the key to form an image. The image is then digitized and information created therefrom, including information about the width of the blade of the key at a plurality of selected longitudinal positions along the length to include the width of the blade at the location of at least one cut of the bitting pattern. The information about the bitting pattern of the key digitized can then be used to form the unique key identifier.

As screenshot 900 in FIG. 9 shows, a Step 410 comprises inputting a key description through a user interface of a display of the mobile electronic computing device of the user and associating the key description with the unique key identifier. The key description is input into a text field in screenshot 900. Multiple inputted keys shown in screenshot 1000 (FIG. 10) can be stored simultaneously to have a large database of keys available for viewing on the mobile electronic computing device. The key description allows the user to correlate the key with a corresponding keyway structure. Those skilled in the art will recognize that this may be useful when a large number of keys are being carried by the user. In some embodiments, the key description may include a digital image of the key, a physical shape or size description of the key, and the location of the keyway structure associated with the key.

Another Step 412 may include storing the unique key identifier and key description on the memory of the mobile electronic computing device of the user, the memory having a plurality of unique key identifiers with associated key descriptions resident thereon and corresponding with a plurality of keys of the user. For example, FIG. 11 references a dialogue box 1100 that instructs the key has been imaged and stored into the memory of the mobile electronic computing device. In this manner, the user has available on a personal smart phone or tablet, images, descriptions, and key bitting data for the plurality of keys. This data is stored for use in identifying keys, cutting replacement keys, and tracking the location of the keyway structure associated with the keys. As such, the user may store a plurality of unique key identifiers and key descriptions into the memory of the mobile electronic computing device, or the remote database for recall to effectively and efficiently track and manage a plurality of keys.

In one embodiment, a Step 414 comprises receiving, through the camera on the mobile electronic computing device of the user, a secondary digital image of a recall key. The recall key is defined as a template key having substantially the same unique key identifiers, i.e., bitting, as the key. The method also includes a Step 416 of utilizing the key-tracking mobile software application to obtain a secondary unique key identifier associated with a key bitting corresponding with the recall key and from the digital image of the recall key. The digital image of the recall key may be associated with the key, and each of the plurality of keys, during the storage process. By providing the recall key unique identifier, the key can be identified properly, and a replacement key can be cut, as described below.

Yet another Step 418 comprises comparing the secondary unique key identifier to the plurality of unique key identifiers to ascertain at least one of a key-match or key-non-match, the key-match representing the secondary unique key identifier of the recall key substantially corresponding to the unique key identifier associated of the key and causing the key-tracking mobile software application to display on the user interface at least one of the key description and the digital image corresponding to the key.

In one embodiment, a Step 420 comprises providing an electronic key-cutting machine communicatively coupled to the mobile electronic computing device of the user, the electronic key-cutting machine being operable to cut the key bitting corresponding with the recall key. The electronic key-cutting machine may be remote, such as a key cutting service. In one embodiment, the remote key-cutting machine is accessed by communicating a particular digital key profile to a third-party who cuts a replacement key if that key is lost or needs duplication. In another embodiment, the electronic key-cutting machine is in possession of the user, such as the user maintaining a small key cutter in a vehicle for emergency key replacement.

In some embodiments, a Step 422 includes communicating the key bitting corresponding with the recall key to the electronic key-cutting machine. The key bitting corresponding with the recall key is stored in the memory for easy access. This may include communicating a particular digital key profile to the key-cutting device that cuts a replacement key if that key is lost or needs duplication. Yet another Step 424 comprises cutting, with the electronic key-cutting machine, the key such that the key bitting substantially matches the key bitting of the secondary unique key identifier of the recall key corresponding to the key.

Figure 12:
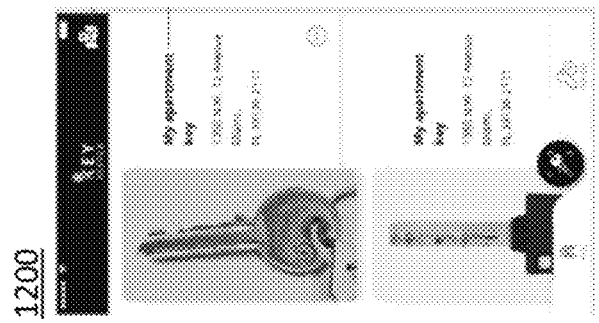
FIG. 12 is a screenshot showing the digital image of the stored keys, with respective key descriptions, and the corresponding location of the keyway structure, in accordance with the invention.

Yet another Step 426 comprises storing a location of a keyway structure associated with the unique key identifier and the key description on the memory of the mobile electronic computing device of the user. FIG. 12 references a screenshot 1200 displaying the digital image of the stored keys, with respective key descriptions, and the corresponding location of the keyway structure. The keyway structure may include, without limitation, a door keyway, a gate keyway, a vehicle ignition keyway, a safe keyway, or any keyway that requires a key to open a connected structure.

Figure 13:
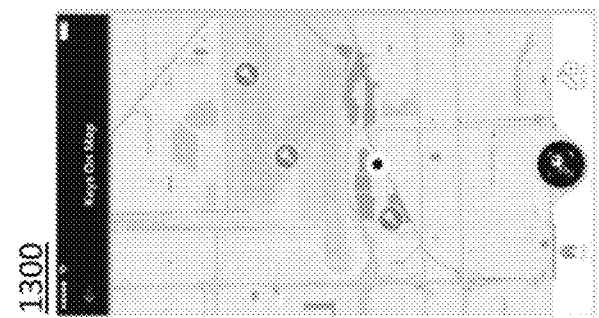
FIG. 13 is a screenshot showing the digital map and the physical location of the keyway structures in relation to streets and geographic boundaries on the digital map, in accordance with the invention.

Another Step 428 may include displaying, by the key-tracking mobile software application, on the user interface, a digital map, the digital map identifying the location of the keyway structure associated with the unique key identifier and the key description. Turning now to screenshot 1330, FIG. 13 illustrates the digital map and the physical location of the keyway structures in relation to streets and geographic boundaries on the digital map. FIGS. 18-19 show how the key-tracking mobile software application correlates to the digital map. Screenshot 1800 illustrates the digital map, and a keyway structure on the digital map. Screenshot 1900 shows a pair of keys with their corresponding keyways structure locations, which are viewable on the digital map. And as shown in FIG. 20, an edit screenshot 2000 allows the user to delete the key from memory, and edit the key description.

In some embodiments, the digital map may include a web-based map that shows street maps, satellite imagery, aerial photography, 360° panoramic views of streets, and real-time traffic conditions thereof. The digital map is viewable directly on the mobile electronic computing device. The user can drag on the map so that the grid squares are downloaded from the memory or remote database/server 120 and inserted into the digital map.

Figure 14:
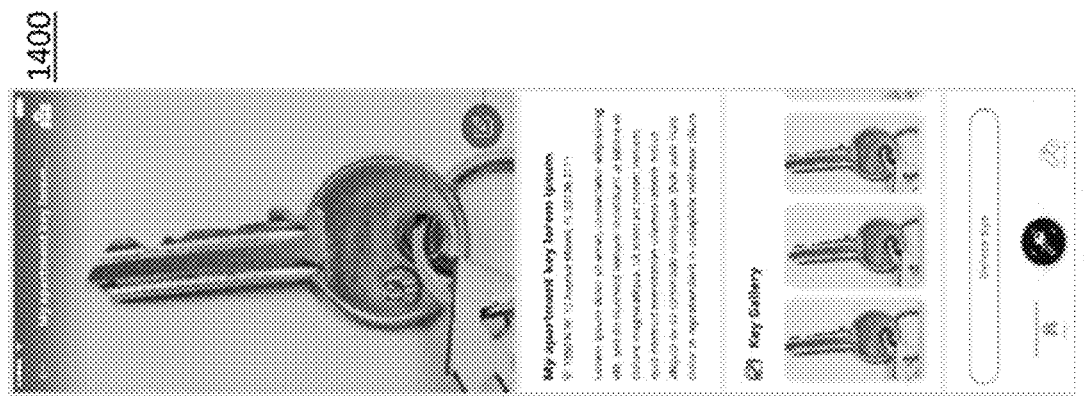
FIG. 14 is a screenshot showing the location of the keyway structure being inputted through the display of the mobile electronic computing device, in accordance with the invention.

As screenshot 1400 in FIG. 14 shows, a final Step 430 includes inputting the location of the keyway structure through the user interface of the display of the mobile electronic computing device of the user and associating the keyway structure with the key description and causing the key-tracking mobile software application to display on the digital map the key description associated with the keyway structure. Thus, when the user searches for the location of the keyway structure, the corresponding key identifiers and key description are downloaded from the memory.

Although FIGS. 4A-4B show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 4A-4B for the sake of brevity. In some embodiments, some or all of the process steps included in FIGS. 4A-4B can be combined into a single process.

Figure 23:
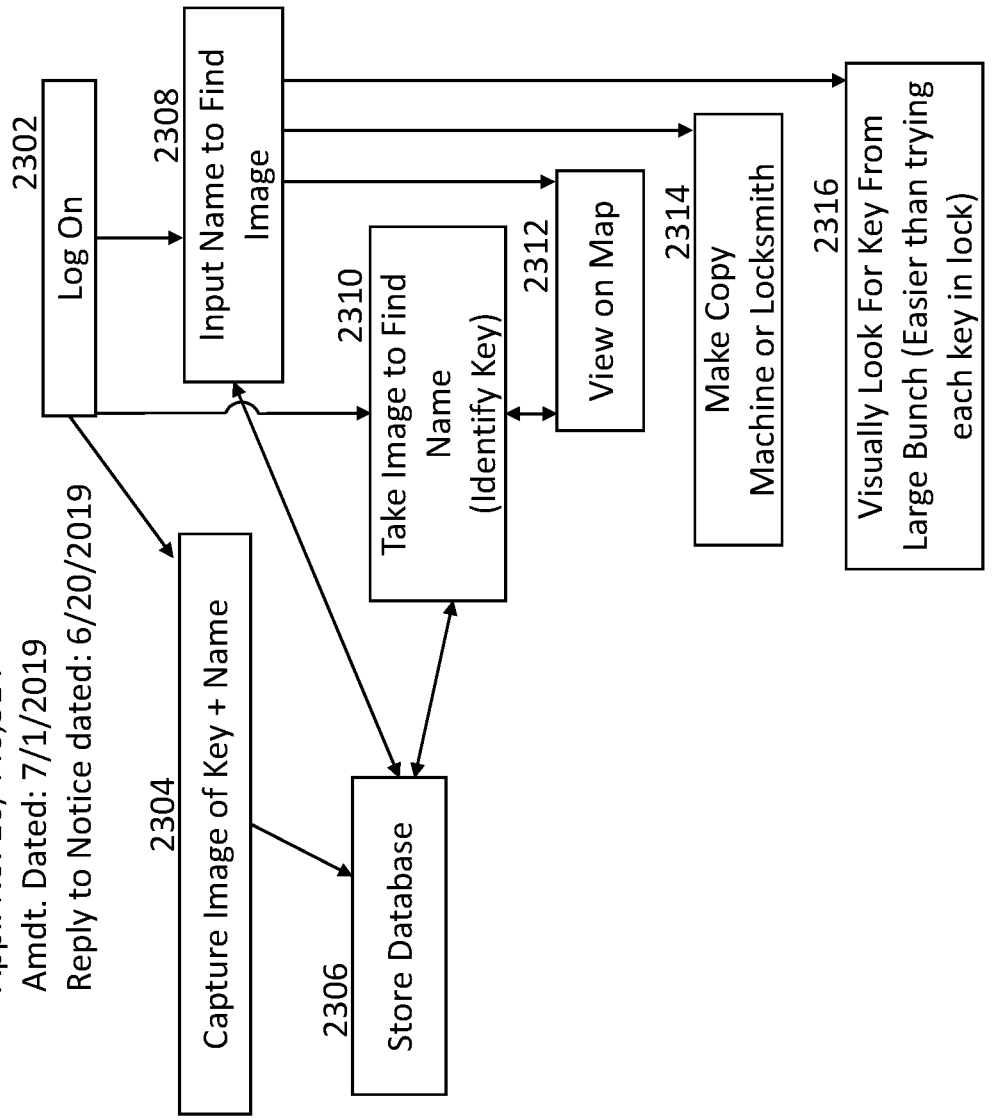
FIG. 23 is a flowchart diagram of an alternative embodiment of the key tracking system, in accordance with the invention.

FIG. 23 shows another exemplary method 2300 of computer software-implemented key tracking. In this method 2300, the user performs a first Step 2302 of logging onto the communication device, and the software application. The user then performs a Step 2304 of capturing an image of a personal key, amongst a plurality of keys. As above, a Step 2306 includes storing the image of the key on a database. The database may be at a remote location, or a storage medium directly on the communication device of the user. A search Step 2308 may include inputting key information to download the image of the key. This Step 2308 may also be performed directly after logging in, for previously stored images of keys.

Conversely, the image of the key can be captured to upload key information from the database in a Step 2310. Further, a Step 2312 includes displaying the location of the key, or an associated keyway structure, on a digital map. The digital map is viewable on the communication device, serving to identify the location of the keyway structure associated with the unique key identifier and the key description. A Step 2314 includes making a copy of the key, based on the image of the recall key. For example, a skilled locksmith can use the recalled image of the recall key to make a copy of a wide range of keys. Another Step 2316 allows the user to visually inspect an image of the key from a plurality of keys. This is easier than visually distinguishing form the physical keys themselves—namely because the key identifiers and descriptions can be digitally displayed based on the key images.

Referring to FIG. 21, a block diagram of a data processing system 2100 that may be implemented as a server, such as the administrator server referenced above, or other computing device coupled to a potential network facilitating in the key tracking and management method described herein. Specifically, the data processing system 2100 may be a symmetric multiprocessor (SMP) system including a plurality of processors 2102 and 2104 connected to system bus 2106. Alternatively, a single processor system may be employed. Also, connected to system bus 2106 is memory controller/cache 2108, which provides an interface to local memory 2110. An I/O bus bridge 21218 is connected to system bus 2106 and provides an interface to I/O bus 2112. The memory controller/cache 2108 and I/O bus bridge 2148 may be integrated as depicted. The processor 2102 or 2104 in conjunction with memory controller 2108 controls what data is stored in memory 2110, e.g., for storing unique key identifiers or key descriptions. The processor 2102 and/or 2104 and memory controller 2108 can serve as a data counter for counting the rate of data flow to the memory 2110 or from the memory 2110 and can also count the total volume of data accessed to or from the memory 2110. The processor 2102 or 2104 can also work in conjunction with any other memory device or storage location.

Peripheral component interconnect (PCI) bus bridge 2114 connected to I/O bus 2112 provides an interface to PCI local bus 2116. A number of modems 2118, or wireless cards, may be connected to PCI bus 2116. Typical PCI bus implementations will support four PCI expansion slots or add-in connectors. PCI includes, but is not necessarily limited to, PCI-X and PCI Express components. Communications links to the network of computers or devices in FIG. 22 system architecture provided through the modem 2118 and network adapter 2120 connected to PCI local bus 2116 through add-in boards. Additional PCI bus bridges 2122 and 2124 provide interfaces for additional PCI buses 2126 and 2128, from which additional modems or network adapters may be supported. In this manner, the data processing system 2100 allows connections to a multiple network of computers. A graphics adapter 2140 and hard disk 2142 may also be connected to I/O bus 2112 as depicted, either directly or indirectly.

Those of ordinary skill in the art will appreciate that the hardware depicted in FIG. 21 may vary. For example, other peripheral devices, such as optical disk drives and the like, also may be used in addition to or in place of the hardware depicted. The depicted example is not meant to imply architectural limitations with respect to the present invention.

The processes explained in detail below can be embodied in a computer program. Computer programs (also called computer control logic) are stored in memory such as main memory 2110, removable storage drive 2138, removable media 2136, hard disk 2132, and signals. Such computer programs, when executed, enable the computer system to perform the features of the present invention as discussed herein. In particular, the computer programs, when executed, cause the processor 2102 and/or 2104 to perform the features of the simultaneous website and mobile app creation system. In certain embodiments, the computer program may carry out the timing and "reveal" portions of the above-described method.

In this document, the terms "computer program medium," "computer usable medium," and "computer readable medium" are used to generally refer to media such as main memory 2110, removable storage drive 2144, removable media 2146, hard disk 2142, and signals. These computer program products are means for providing software to the computer system. The computer readable medium allows the computer system to read data, instructions, messages or message packets, and other computer readable information from the computer readable medium. The computer readable medium, for example, may include non-volatile (non-transitory) memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

The network interfaces may also include a local area network (LAN) interface. The LAN interface may be, for example, an interface to a wireless LAN, such as a Wi-Fi network. In one embodiment, there is a wireless LAN that provides the input devices with access to the Internet for receiving and sending inputs/messages to the server 120, over the Internet. The range of the LAN interface may generally exceed the range available via the PAN interface. Typically, a connection between two electronic devices via the LAN interface may involve communication through a network router or other intermediary device.

Additionally, the network interfaces may include the capability to connect to a wide area network (WAN) via a WAN interface 122. The WAN interface 122 may permit a connection to a cellular mobile communications network. The WAN interface 122 may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

Memory associated with the input devices may be, for example, one or more buffer, a flash memory, or non-volatile memory, such as random-access memory (RAM). The input devices may also include non-volatile storage. The non-volatile storage may represent any suitable storage medium, such as a hard disk drive or non-volatile memory, such as flash memory.

Figure 22:
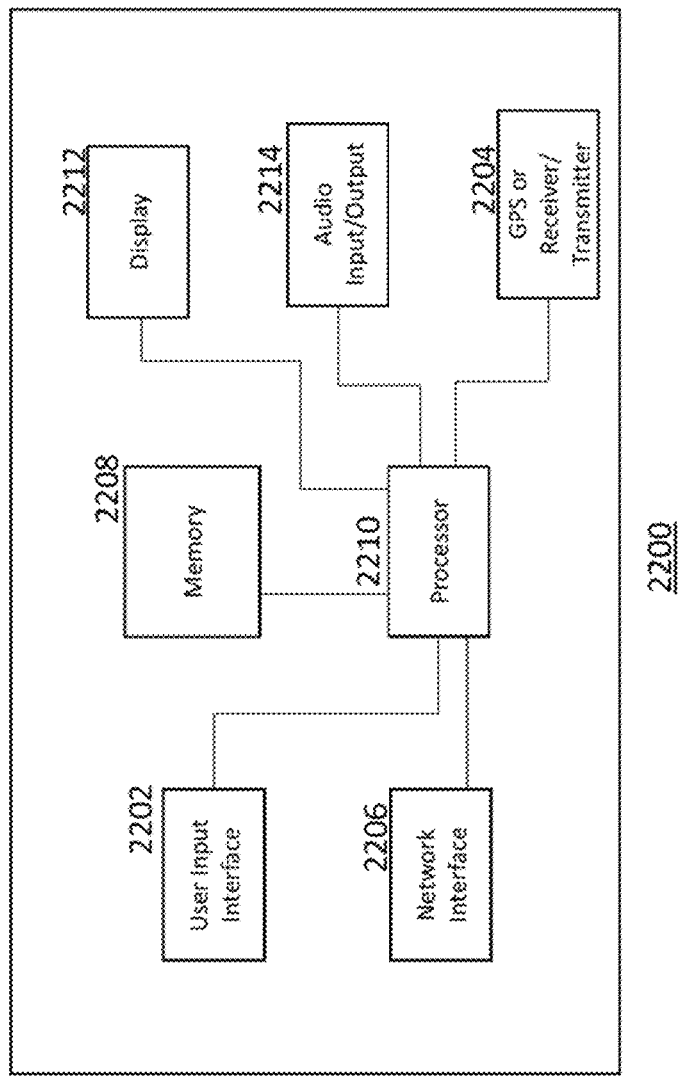
FIG. 22 is a block diagram of an exemplary communication system for operation of the key tracking system, in accordance with the invention.

FIG. 22 is a block diagram of an exemplary communication system 2200 for operation of the key tracking system 100. In this embodiment, the technical components that make the system 2200 operable include audio components that allow for production and listening of the musical compositions 126 in the form of a working digital audio file 128.

Continuing with the system 2200, a processor 2210 works to process, i.e., mix, balance, amplify the audio signals for optimal listening. This can be useful for effective music distribution. The processor is also effective for voice filtering, such as auto tune, deep voice, and vocal dubbing. A memory 2208 stores the working digital audio file 128. The produced musical compositions are configured into a working digital audio file 128 that stores on an administrator server 102. The public listening users 116 who access a music collaboration network 2206 can also access the key description and identifier from the administrator server 102 through a GPS or receiver transmitter 2204. Additionally, a user input interface 2202 may be used to interface with the system through a display screen 2212, and listened to through an audio input/output 2214.

The processing device can be, for example, a central processing unit (CPU), a microcontroller, or a microprocessing device, including a "general purpose" microprocessing device or a special purpose microprocessing device. The processing device executes code stored in memory in order to carry out operation/instructions of the input devices, e.g., to display a key description (e.g., key color, key shape, key size, etc.) to a user based on, for example, the user's or key's address, the user's vehicle information, other key identifying or associated information. The processing device may provide the processing capability to execute an operating system, run various applications, such as the key storing and/or management user interface, communicate with one or more microcontrollers, and provide processing for one or more of the techniques and process steps described herein.

The terms "computer program medium," "computer usable medium," and "computer readable medium" are used to generally refer to media such as main memory, removable storage drive, removable media, hard disk, and/or signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may include computer readable information in a transitory state medium such as a network link and/or a network interface, including a wired or wireless network, which allows a computer to read such computer readable information.

In one embodiment, the software application is operably configured to communicate one or more of the digital key description(s)/bitting(s) stored in the database on the user's electronic device and/or administrator server, i.e., "centrally," to a key cutting device. Storage on a central storage would allow different phones to access the information. For example, if Hertz put all of their cars in the system, a key that shows up in Phoenix might belong to a car in LA. The LA office could have one cut locally etc. One such exemplary method to communicate said digital key description(s)/bitting(s) can be seen depicted in U.S. Pat. No. 6,647,308 (Prejean), which is incorporated herein by reference. As such, a lost, misplaced, or stolen key may be beneficially, quickly, and effectively transmitted to the key cutting device for reproduction.

Furthermore, a few narrow functions that the software code operates are referenced below:

Resizing the digital image of the key to a 8×8 square and returns as image resource*/;

/*returns the mean value of the colors and the list of all pixel's colors*/;

/*returns an array with 1 and zeros. If a color is bigger than the mean value of colors it is 1*;

main function. returns the hammering distance of two images' bit value*/; and

Sending, receiving, and comparing key-related data.

It is also significant to note that any object-oriented programming language may be used to program the code for operation of the system 100 and method 400. Further, both a high-level code and a low-level code may be used to design the present invention. One exemplary computer-implemented software code of ascertaining a unique identifier associated with a key bitting is reproduced below pursuant to 37 C.F.R. § 1.96(b).

```
<?php
namespace App\Service;
class CompareImageService extends BaseManager
{
    * @param $i
    *
    * @return array|bool
    */
    private function mimeType($i)
    {
        /*returns array with mime type and if its jpg or png. Returns false if it isn't jpg or png*/
        $mime = getimagesize($i);
        $return = [$mime[0], $mime[1]];
        switch ($mime['mime']) {
            case 'image/jpeg':
                $return[ ] = 'jpg';
                return $return;
            case 'image/png':
                $return[ ] = 'png';
                return $return;
            default:
                return false;
        }
    }
    /**
    * @param $i
    *
    * @return bool|resource
    */
```

-continued

```
private function createImage($i)
{
    /*retuns image resource or false if its not jpg or png*/
    $mime = $this->mimeType($i);
    if ($mime[2] == 'jpg') {
        return imagecreatefromjpeg($i);
    } else {
        if ($mime[2] == 'png') {
            return imagecreatefrompng($i);
        } else {
            return false;
        }
    }
}
/**
 * @param $i
 * @param $source
 *
 * @return resource
 */
private function resizeImage($i, $source)
{
    /*resizes the image to a 8x8 square and returns as image resource*/
    $mime = $this->mimeType($source);
    $t = imagecreatetruecolor(8, 8);
    $source = $this->createImage($source);
    imagecopyresized($t, $source, 0, 0, 0, 0, 8, 8, $mime[0], $mime[1]);
    return $t;
}
/**
 * @param $i
 *
 * @return array
 */
private function colorMeanValue($i)
{
    /*returns the mean value of the colors and the list of all pixel's colors*/
    $colorList = [ ];
    $colorSum = 0;
    for ($x = 0; $x < 8; $x++) {
        for ($y = 0; $y < 8; $y++) {
            if ($x == 0 || $x == 7 || ($x == 1 && $y > 3) || ($x == 6 && $y > 3 )){
                continue;
            }
            $rgb = imagecolorat($i, $x, $y);
            $colorList[ ] = $rgb & 0xFF;
            $colorSum += $rgb & 0xFF;
        }
    }
    return [$colorSum / 40, $colorList];
}
/**
 * @param $colorMean
 *
 * @return array
 */
private function bits($colorMean)
{
    /*returns an array with 1 and zeros. If a color is bigger than the mean value of colors it is 1*/
    $bits = [ ];
    foreach ($colorMean[1] as $color) {
        $bits[ ] = ($color >= $colorMean[0]) ? 1 : 0;
    }
    return $bits;
}
/**
 * @param $a
 * @param $b
 *
 * @return bool|int
 */
public function compare($a, $b)
{
    /*main function. returns the hammering distance of two images' bit value*/
    $i1 = $this->createImage($a);
    $i2 = $this->createImage($b);
    if (!$i1 || !$i2) {
        return false;
    }
```

-continued

```
        $i1 = $this->resizeImage($i1, $a);
        $i2 = $this->resizeImage($i2, $b);
        imagefilter($i1, IMG_FILTER_COLORIZE, 45, 45, 0);
        imagefilter($i1, IMG_FILTER_GRAYSCALE);
        imagefilter($i2, IMG_FILTER_COLORIZE, 45, 45, 0);
        imagefilter($i2, IMG_FILTER_GRAYSCALE);
        imagefilter($i1, IMG_FILTER_EMBOSS);
        imagefilter($i2, IMG_FILTER_EMBOSS);
        $colorMean1 = $this->colorMeanValue($i1);
        $colorMean2 = $this->colorMeanValue($i2);
        imagedestroy($i1);
        imagedestroy($i2);
        $bits1 = $this->bits($colorMean1);
        $bits2 = $this->bits($colorMean2);
        $hammeringDistance = 0;
        for ($i = 0; $i < 40; $i++) {
            if ($bits1[$i] != $bits2[$i]) {
                $hammeringDistance++;
            }
        }
        return $hammeringDistance;
    }
}
```

As such, the key tracking and management tool may be implemented with carrying out the above-described steps may include a computing means, e.g., a processor, and a storing means, e.g., a memory. The processor is operable to run one or more programs/applications and interfaces associated with the key tracking method to effectuate the data transfer and communications associated by the present invention.

What is claimed is:

1. A computer software-implemented key tracking method comprising the steps of:
   providing a mobile electronic computing device of a user having a camera operably coupled thereto and a memory resident thereon;
   capturing, through the camera on the mobile electronic computing device of the user, a digital image of a key;
   utilizing a key-tracking mobile software application resident on the memory of the mobile electronic computing device of the user to obtain a unique key identifier associated with a key bitting corresponding with the key and from the digital image of the key;
   inputting a key description, including a keyway structure lockable and unlockable with the key bitting of the key associated with the unique key identifier, through a user interface of a display of the mobile electronic computing device of the user and associating the key description and the keyway structure with the unique key identifier;
   storing the unique key identifier and key description on the memory of the mobile electronic computing device of the user, the memory having a plurality of unique key identifiers with associated key descriptions, including associated keyway structures, resident thereon and corresponding with a plurality of keys of the user;
   receiving, through the camera on the mobile electronic computing device of the user, a secondary digital image of a recall key;
   utilizing the key-tracking mobile software application to obtain a secondary unique key identifier associated with a key bitting corresponding with the recall key and from the digital image of the recall key;
   comparing the secondary unique key identifier to the plurality of unique key identifiers to ascertain at least one of a key-match or key-non-match, the key-match representing the secondary unique key identifier of the recall key substantially corresponding to the unique key identifier associated of the keys; and
   displaying on the user interface of the display of the mobile electronic computing device of the user the key description, including the keyway structure.

2. The computer software-implemented key tracking method according to claim 1, further comprising:
   providing an electronic key-cutting machine communicatively coupled to the mobile electronic computing device of the user, the electronic key-cutting machine being operable to cut the key bitting corresponding with the recall key.

3. The computer software-implemented key tracking method according to claim 2, further comprising:
   communicating the key bitting corresponding with the recall key to the electronic key-cutting machine.

4. The computer software-implemented key tracking method according to claim 3, further comprising:
   cutting, with the electronic key-cutting machine, the key such that the key bitting substantially matches the key bitting of the secondary unique key identifier of the recall key corresponding to the key.

5. The computer software-implemented key tracking method according to claim 4, wherein:
   the electronic key-cutting machine is remotely located from the user.

6. The computer software-implemented key tracking method according to claim 4, wherein:
   the electronic key-cutting machine is operable by the user.

7. The computer software-implemented key tracking method according to claim 4, further comprising:
   storing a location of a keyway structure associated with the unique key identifier and the key description on the memory of the mobile electronic computing device of the user.

8. The computer software-implemented key tracking method according to claim 7, wherein:
   the keyway structure includes at least one of the following: a door keyway, a gate keyway, a vehicle ignition keyway, and a safe keyway.

9. The computer software-implemented key tracking method according to claim 8, further comprising:

displaying, by the key-tracking mobile software application, on the user interface, a digital map.

10. The computer software-implemented key tracking method according to claim 9, further comprising:
identifying, on the digital map, the location of the keyway structure associated with the unique key identifier and the key description.

11. The computer software-implemented key tracking method according to claim 10, further comprising:
displaying on the digital map the key description associated with the keyway structure.

12. The computer software-implemented key tracking method according to claim 11, further comprising:
identifying, on the digital map the location of the remote electronic key-cutting machine.

13. The computer software-implemented key tracking method according to claim 12, wherein:
the key description comprises a digital image of the key, a physical shape or size description of the key, and the location of the keyway structure associated with the key.

14. The computer software-implemented key tracking method according to claim 13, wherein:
The unique key identifier includes at least one of the following: a key brand name, a key type, a number of pins, a pin key code, and the location of the keyway structure.

15. The computer software-implemented key tracking method according to claim 1, further comprising:
capturing a picture, through the camera on the mobile electronic computing device, of the digital image of the key.

16. The computer software-implemented key tracking method according to claim 1, further comprising:
scanning, through the camera on the mobile electronic computing device, the digital image of the key.

17. The computer software-implemented key tracking method according to claim 1, further comprising:
logging in to the key-tracking mobile software application through the mobile electronic computing device.

18. The computer software-implemented key tracking method according to claim 1, further comprising:
resizing the digital image of the key to an 8"×8" square dimension.

19. A computer software-implemented key tracking method comprising the steps of:
providing a mobile electronic computing device of a user having a camera operably coupled thereto and a memory resident thereon;
logging in to a key-tracking mobile software application through the mobile electronic computing device;
capturing, through the camera on the mobile electronic computing device of the user, a digital image of a key;
utilizing the key-tracking mobile software application resident on the memory of the mobile electronic computing device of the user to obtain a unique key identifier associated with a key bitting corresponding with the key and from the digital image of the key;
inputting a key description, including a keyway structure lockable and unlockable with the key bitting of the key associated with the unique key identifier, through a user interface of a display of the mobile electronic computing device of the user and associating the key description and the keyway structure with the unique key identifier;
storing the unique key identifier and key description on the memory of the mobile electronic computing device of the user, the memory having a plurality of unique key identifiers with associated key descriptions resident thereon and corresponding with a plurality of keys of the user;
receiving, through the camera on the mobile electronic computing device of the user, a secondary digital image of a recall key;
utilizing the key-tracking mobile software application to obtain a secondary unique key identifier associated with a key bitting corresponding with the recall key and from the digital image of the recall key;
comparing the secondary unique key identifier to the plurality of unique key identifiers to ascertain at least one of a key-match or key-non-match, the key-match representing the secondary unique key identifier of the recall key substantially corresponding to the unique key identifier associated of the key and causing the key-tracking mobile software application to display on the user interface at least one of the key description and the digital image corresponding to the key;
providing an electronic key-cutting machine communicatively coupled to the mobile electronic computing device of the user, the electronic key-cutting machine being operable to cut the key bitting corresponding with the recall key;
communicating the key bitting corresponding with the recall key to the electronic key-cutting machine;
cutting, with the electronic key-cutting machine, the key such that the key bitting substantially matches the key bitting of the secondary unique key identifier of the recall key corresponding to the key;
storing a location of a keyway structure associated with the unique key identifier and the key description on the memory of the mobile electronic computing device of the user;
displaying, by the key-tracking mobile software application, on the user interface, a digital map, the digital map identifying the location of the keyway structure associated with the unique key identifier and the key description; and
inputting the location of the keyway structure through the user interface of the display of the mobile electronic computing device of the user and associating the keyway structure with the key description and causing the key-tracking mobile software application to display on the digital map the key description associated with the keyway structure.

\* \* \* \* \*